United States Patent [19]

Rufin

[11] Patent Number: 5,001,873
[45] Date of Patent: Mar. 26, 1991

[54] METHOD AND APPARATUS FOR IN SITU CLEANING OF EXCIMER LASER OPTICS

[75] Inventor: Denis A. Rufin, Hinsdale, Ill.
[73] Assignee: American Air Liquide, New York, N.Y.
[21] Appl. No.: 371,103
[22] Filed: Jun. 26, 1989
[51] Int. Cl.$^5$ .................... B24B 1/00; B24C 1/00; B08B 7/00; H01S 3/00
[52] U.S. Cl. ................... 51/320; 51/322; 51/411; 51/284 R; 134/7; 372/109; 372/57
[58] Field of Search ............. 51/319, 320, 321, 314, 51/410, 317, 322, 411, 284 R; 134/7, 93; 372/109, 33, 98, 57, 331

[56] References Cited

U.S. PATENT DOCUMENTS

| | | | |
|---|---|---|---|
| 3,731,227 | 5/1973 | Rosenberger et al. | 372/33 X |
| 4,052,680 | 10/1977 | Wang et al. | 372/33 |
| 4,631,250 | 12/1986 | Hayashi | 51/320 X |
| 4,718,071 | 1/1988 | Steffen | 372/33 X |
| 4,806,171 | 2/1989 | Whitlock et al. | 51/320 X |

Primary Examiner—Frederick R. Schmidt
Assistant Examiner—Bruce P. Watson
Attorney, Agent, or Firm—Oblon, Spivak, McClelland, Maier & Neustadt

OTHER PUBLICATIONS

Patent Abstracts of Japan, Vol. 12, No. 211 (E-622) [3058], June 16, 1988; & JP-A-63 9171 (KOMATSU), January 14, 1988.
Patent Abstracts of Japan, Vol. 12, No. 211 (E-622) [3058], June 16, 1988; & JP-A-63 9175 (KOMATSU), January 14, 1988.
Patent Abstracts of Japan, Vol. 11, No. 400 (E-569) [2847], December 26, 1987; & JP-A-62 160 799 (NIPPON KOGAKU), July 16, 1987.

[57] ABSTRACT

A method and apparatus for cleaning the optical elements in an excimer laser in situ. A source of high pressure carbon dioxide gas is allowed to escape through a nozzle facing the surface of the optical elements. The escaping gas expands and cools sufficiently to form a carbon dioxide ice jet. The ice jet strikes the surface of the optical elements causing cleaning of the elements by abrasion. Carbon dioxide may be removed merely by evacuation and purging of the system. Thus the mirrors are cleaned without removing them.

15 Claims, 1 Drawing Sheet

METHOD AND APPARATUS FOR IN SITU CLEANING OF EXCIMER LASER OPTICS

BACKGROUND OF THE INVENTION

1. Field of the Invention

This invention relates generally to the cleaning of optical elements in an excimer laser and more particularly to the cleaning of optical elements in situ using a carbon dioxide ice jet.

2. Discussion of Background

Various types of lasers have been developed in order to provide coherent light sources of different wavelengths. Excimer lasers are one type which are particularly valuable in that they are powerful ultraviolet sources. While their use previously was mostly in research, they are now becoming even more valuable in various materials processing areas. Excimer lasers use a mixture of gases which interact when excited by an electron beam or similar device. Thus, the mixture may include a combination of a halogen gas and one or more of the noble gases. For example, florine may be used with a mixture of argon and neon, a mixture of krypton and neon or a mixture of krypton and helium. Likewise chlorine may be used with a mixture of noble gases such as xenon and neon or xenon and helium.

One of the difficulties encountered in the use of an excimer laser is that the optics involved with the laser must be periodically cleaned. The optics usually involve a mirror or partially reflecting mirror at either end of the laser cavity. Various by-products are deposited on the optics in the course of operation of the device. Although the source of these deposits is not completely clear, they appear to involve impurities included in the gases, dust and other particulate matter and other by-products caused by the interaction of the gases. Since these deposits tend to absorb the ultraviolet light their presence reduces the power of the laser and must be periodically removed.

In the past, the optics have been cleaned by hand, that is by shutting down the laser, removing the mirrors and cleaning them with a solvent. The mirrors must then be replaced and realigned before the laser may be utilized again. This entire procedure may cause an interruption of an hour in the operation of the laser.

SUMMARY OF THE INVENTION

Accordingly, one object of this invention is to provide a novel method for cleaning the optics of a laser without removing them from the laser.

Likewise, a second object of this invention is to provide an novel apparatus for cleaning the optics in a laser without removing them.

Another object of this invention is to provide a novel method for cleaning the optics in a laser by utilizing a material which leaves no deposits.

Another object of this invention is to provide a novel apparatus for cleaning the optics in a laser with a material which leaves no deposits.

Another object of this invention is to provide a quicker and more efficient cleaning of the optics in a laser.

A still further object of this invention is provide a method and apparatus for cleaning the optics in a laser in situ using an ice jet of carbon dioxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The figure is a schematic of the present invention.

DESCRIPTION OF THE PREFERRED EMBODIMENTS

Figure 1:
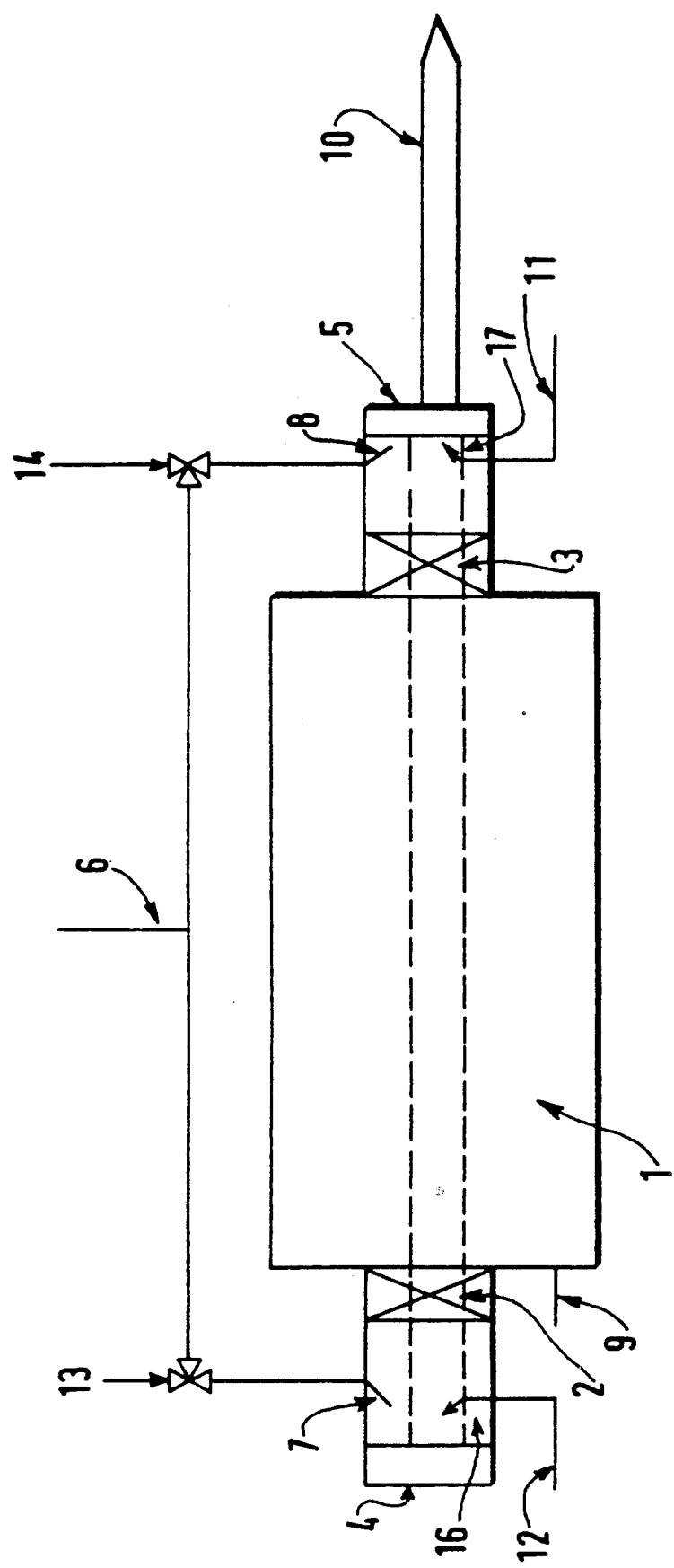

Various other objects, features and attendant advantages of the present invention will be more fully appreciated as the same becomes better understood from the following detailed description when considered in connection with the accompanying drawings in which like reference characters designate like or corresponding parts throughout the several views and wherein the figure shows the overall arrangement of the various parts of the present invention. The laser vessel 1 acts as the chamber in which the excimer gases are mixed and activated to produce a coherent light beam 10. An optical element including a mirror 4 and a partially reflecting mirror 5 are provided at opposite ends of the laser vessel. As is well known in the prior art, the partially reflecting mirror 5 allows part of the reflected beam to escape as the output of the laser. The remainder of the beam is reflected through the vessel to maintain the oscillation. Gate valves 2 and 3 are provided on opposite ends of the vessel in order to seal the vessel and to contain the gas therein. This is done before the cleaning operation so that most of the gas may be reused. The valves also protect the gas from contamination by the cleaning material or the removed deposits.

The gases which are used for the laser operation itself are provided through inlet 6 which is carried through conduits to injection nozzles 7, 8 at each end of the laser vessel. This gas is provided in a manner known in the prior art and may be controlled, as is necessary, in a known manner. Likewise, an outlet for the process gas 9 is provided from the laser vessel. The three-way valves 13 and 14 are provided along the process gas lines for the purposes of evacuating and purging the gas during the cleaning operation.

A source of high purity high pressure carbon dioxide (not shown) is connected to gas inlets 11 and 12 to provide carbon dioxide to cleaning gas nozzles 16 and 17. These nozzles allow the gas to escape into an area of lower pressure. Due to the expansion of the gas into this lower pressure the gas is cooled sufficiently to form carbon dioxide ice particles which are carried as a jet toward the optical elements. The impact of the carbon dioxide ice on the surface of the mirrors acts to remove the deposits by abrasion. Since the cleaning material is only the carbon dioxide itself, this is easily removed as the ice evaporates.

In operation, the excimer laser may be cleaned by stopping the electron beam which causes the laser to operate. At the same time, the process gas inlet 6 and outlet 9 may be closed to prevent the movement of gas during the cleaning operation. Gate valves 2 and 3 are closed to seal off the gas contained in the vessel itself so as to prevent contamination and to allow this gas to be reused. Three-way valves 13 and 14 are connected to a source of evacuation to remove any gas which remains in the area between the gate valves and the optics. The three-way valves may then be connected to a source of purging gas, preferably helium or perhaps nitrogen, to emit the purging gas through nozzles 7 and 8. The purging gas may then also be evacuated by similar method. After the area is purged and evacuated, nozzles 16 and 17 receive a flow of carbon dioxide gas. The gas being emitted from the nozzles becomes cold due to the expansion of the gas, forming carbon dioxide ice particles. The result of this is a carbon dioxide ice jet consisting mostly of solid particles but possibility consisting also of some remaining carbon dioxide gas. The ice particles impact on the surface of the mirrors thus causing them to be cleaned. As the ice particles warm up, they evaporate to form carbon dioxide gas. This may be removed by connecting the three-way valves to a source of evacuation. This evacuation may also continue through the injection phase if desired so that too much pressure does not build up. After the cleaning is complete, the source of carbon dioxide is removed and the areas fully evacuated. A purging operation then proceeds, as previously, and the area evacuated again. After the mirrors have been cleaned and the area fully purged and evacuated the gate valves are opened and the process gas inlets and outlets returned to their opened position, thus allowing the laser to proceed again.

The present invention provides several advantages over the prior art. By doing the cleaning in situ, it is not necessary to realign the mirrors which is a time consuming process. Also, the danger of dropping or damaging the mirrors during the cleaning process is removed. By using the gate valves, most of the expensive gases which are used in the laser may be reused. The operation is easy and convenient and readily learned. The time involved is considerably less then that required for a manual cleaning operation. This type of device can be readily applied to most existing laser without major modifications. Thus, it is possible to practice the invention not only on new devices but also on existing devices.

Various modifications may be made on this apparatus and still operate in a similar fashion. Although the cleaning gas nozzles have been described as producing the ice merely by the expansion and resultant in cooling of the gas, it would also be possible to include a cooling system on the cleaning gas line to further cool the gas before being released through the nozzle. Likewise it would be possible to include a small cooling element in the escaping stream of gas if necessary. Although the source of purging gas has been described as being connected through the three-way valve, it would also be possible to include a separate nozzle for this purpose. Materials other then carbon dioxide may also be used as long as the cleaning material may be removed by a simple process of evacuation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for in situ cleaning of optical elements in a laser, comprising the steps of:
   providing a nozzle in said laser, facing each optical element;
   connecting a source of cleaning material to each nozzle;
   producing an ice jet of said cleaning material from each nozzle which strikes the corresponding optical element;
   cleaning each optical element by the impact of said ice jet thereon.

2. The method according to claim 1, further comprising the step of evacuating the laser before producing the ice jet.

3. The method according to claim 1, further comprising the step of evacuating the laser after the cleaning operation to remove the cleaning material.

4. The method according to claim 1, wherein said cleaning material readily turns to gas after the cleaning operation for easy removal.

5. The method according to claim 4, wherein said cleaning material is carbon dioxide.

6. The method according to claim 1, wherein a main portion of the laser separate from the area around each optical element is sealed off so as to avoid contamination of the gas contained therein.

7. A method of in situ cleaning of optical elements in the laser, comprising the steps of:
   providing a nozzle in said laser facing each optical element;
   connecting each nozzle to a source of cleaning material;
   evacuating the part of the laser near each optical element;
   expanding said cleaning material through the nozzle, thus cooling the cleaning material;
   producing an ice jet of said cleaning material;
   impinging said ice jet on said optical elements;
   cleaning the optical elements by the impact of the ice jet; and
   evacuating said part of said laser in front of said optical elements.

8. The method according to claim 7, further comprising the step of purging and evacuating after each evacuation step.

9. The method according to claim 7, wherein said cleaning material is carbon dioxide.

10. The method according to claim 7, further comprising the step of sealing off the main part of the laser from said part near each optical element so as to avoid contamination of the gas contained therein.

11. Apparatus for in situ cleaning of optical elements of a laser comprising:
    a source of cleaning material;
    a nozzle connected to said source of cleaning material, said nozzle mounted in said laser facing an optical element;
    said nozzle producing an ice jet of said cleaning material which strikes said optical element to clean them thereby.

12. The apparatus according to claim 11, further comprising a source of evacuation for removing gas from the laser before cleaning and for removing the cleaning material after cleaning.

13. The apparatus according to claim 12, further comprising a source of purge gas for purging the laser before each evacuation.

14. The apparatus according to claim 11, further comprising at least one gate valve for sealing off a main portion of the laser away from said optical elements to prevent contamination of the gas contained therein.

15. The apparatus according to claim 11, wherein said cleaning material is carbon dioxide.

* * * * *